Feb. 27, 1940.　　C. A. JENSEN　　2,191,485
EXHAUST VALVE SEAT INSERT RETAINING AND COOLING MEANS
Filed Jan. 10, 1938
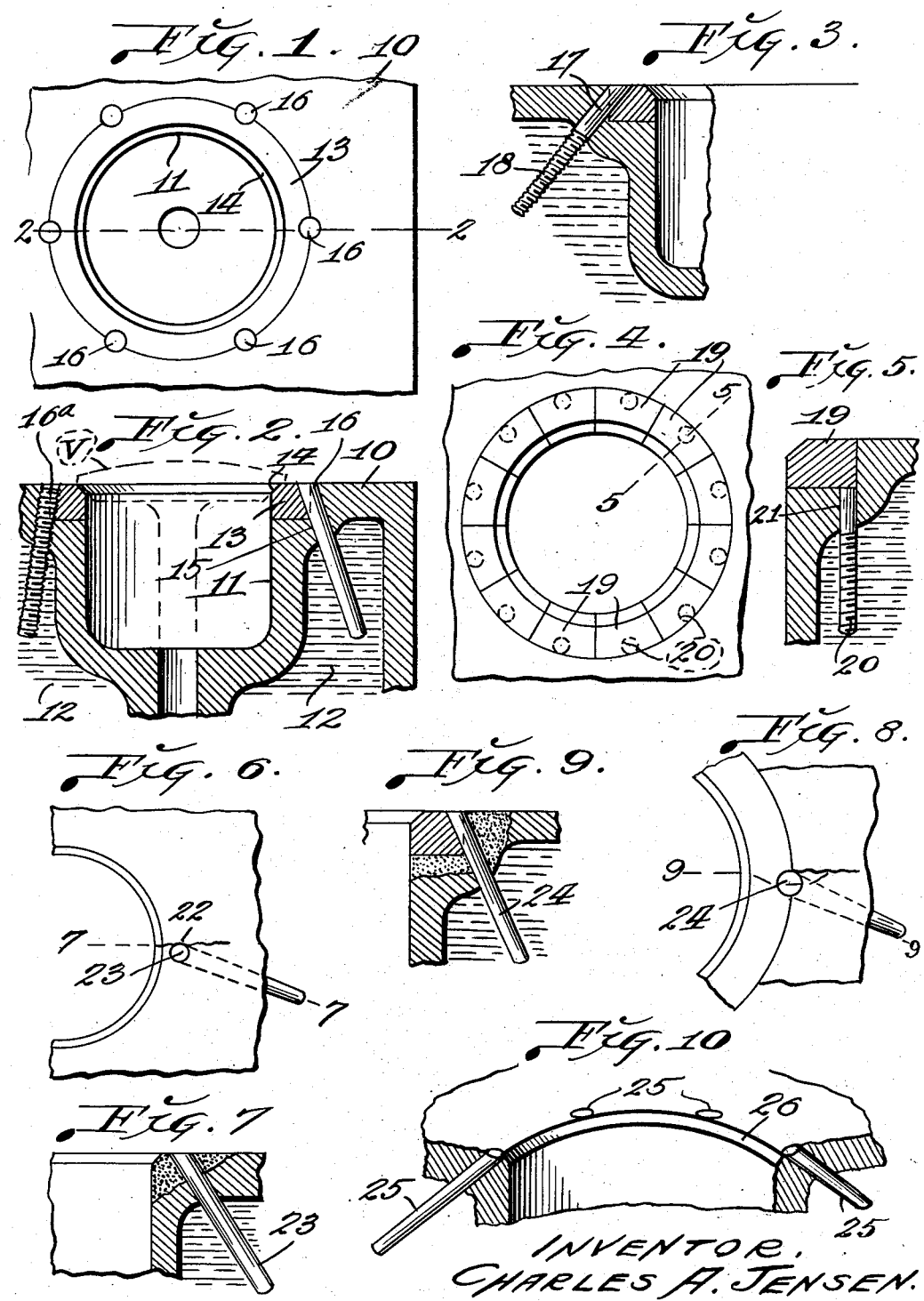
INVENTOR,
CHARLES A. JENSEN.
BY Martin ?Smith ATTY.

UNITED STATES PATENT OFFICE 2,191,485

EXHAUST VALVE SEAT INSERT RETAINING AND COOLING MEANS

Charles Augustus Jensen, Los Angeles, Calif., assignor of one-half to Grace E. Jensen, Los Angeles, Calif.

Application January 10, 1938, Serial No. 184,199

4 Claims. (Cl. 123—188)

My invention relates generally to internal combustion engines and more particularly to the exhaust valves seats thereof, and the principal object of my invention is, to provide an insert in the form of a ring having a beveled face that serves as a seat for the exhaust valve, said insert being seated in the cylinder-block around the exhaust pocket or chamber therein, and said insert being rigidly secured to the block by pins or screws that extend downwardly into the adjacent cooling fluid circulation chambers within the block, thus effecting an exchange of temperatures that is highly effective in counteracting the relatively high temperatures to which the valve seat is subjected while the engine is in operation.

Heretofore, where valve seat inserts have been used, it is the general practice to secure the same to the block by the use of short screws that enter threaded recesses formed partly in the block and partly in the inserts; while other forms of inserts are externally threaded and screwed into the block. Such inserts are generally composed of two rings fused together; the inner half of the ring being composed of hard metal and the outer half composed of metal soft enough to drill readily. All so-called hard seats have the relatively soft outer portion, and no matter how tight the insert is seated in the block, it will sooner or later become loose as a result of continued expansion and contraction due to the high and low temperatures that prevail while the engine is in operation or standing idle for some time.

I have found that by using pins or screws that hold the insert in place and extending said pins or screws into the cooling fluid circulation chambers surrounding the exhaust outlets, the inserts will not become loose, and which result is due to the cooling effect produced upon the extended portions of the pins or screws by the cooling medium and the transference of such cooling temperatures directly to the inserts. Tapered pins are preferable for this work for the reason that their use effects a material saving of time and labor in the installation of the inserts, although screws may be advantageously employed. Further, to increase the cooling effect, those portions of the tapered pins that project into the cooling fluid circulation chambers may be threaded so as to materially increase the area of metal that is exposed to the cooling medium.

The holes that receive the pins may be tapered or of the same diameter throughout their lengths, and a tapered pin, if driven into a straight or non-tapered hole, will seal the same and effectively secure the insert to the cylinder block.

Further, my invention contemplates the use of pins or screws composed of metal having a higher degree of heat conductivity than the metal forming the cylinder-block, and the inserts, and such construction, when used, is effective in counteracting the high temperatures prevailing in the insert and the adjacent metal in the block.

In some instances, it has been the practice to construct the valve seat inserts oversize, and to drive or press the same into the slightly smaller recesses around the exhaust chambers. This practice very frequently produces sufficient pressure to crack the block. In my improved construction, the insert can be the same size as the recess and rigidly held in inserted position by the pins or screws, and thus there is no possibility of cracking the block as a result of the seating of the insert therein.

It frequently happens that the metal in the block immediately adjacent the exhaust valve seat or the insert that is provided with the valve seat becomes checked, and it is one of the objects of my invention to repair these checks by inserting therein suitable material, for instance iron-cement or fine metal dust to seal the check, and also to insert immediately adjacent the check, one or more pins or screws of sufficient length so that substantial portions thereof will project into the adjacent cooling fluid circulation chambers. By so doing, the cooling effect of the circulating cooling medium is continuously imparted to the pins or screws and to the sealed check and thereby maintaining the same in sealed condition due to the lowering of the temperature in said check so as to counteract tendency of the sealing material to become loose as a result of abnormal expansion and contraction.

With the foregoing and other objects in view, my invention consists in certain novel features of construction and arrangements of parts that will be hereinafter more fully described and claimed and illustrated in the accompanying drawing in which:

Fig. 1 is a top plan view of a portion of a cylinder-block, and showing an exhaust valve seat insert secured to said block with pins or screws as contemplated by my invention.

Fig. 2 is a vertical section taken on the line 2—2 of Fig. 1.

Fig. 3 is a detail sectional view showing the insert secured in the block by a pin having a threaded portion that projects into a cooling fluid circulation chamber.

Fig. 4 is a plan view of an insert composed of a plurality of segments that are seated in the block around the exhaust valve opening or pocket.

Fig. 5 is an enlarged cross-section taken on the line 5—5 of Fig. 4.

Fig. 6 is a plan view showing a portion of a block adjacent the exhaust valve opening, and showing a check sealed in accordance with my invention.

Fig. 7 is a vertical cross-section taken on the line 7—7 of Fig. 6.

Fig. 8 is a fragmentary plan view showing a valve seat insert positioned in a block having a check or small crack that is sealed with the pin that anchors the insert to the block.

Fig. 9 is a vertical sectional view taken on the line 9—9 of Fig. 8.

Fig. 10 is a fragmentary perspective view of a portion of a block with pins extending from said block adjacent the exhaust valve seat into the adjacent cooling fluid chambers.

Referring by numerals to the accompanying drawing which illustrates a preferred embodiment of my invention, and particularly to the construction illustrated in Figs. 1 to 3 inclusive, 10 designates the cylinder-block that is provided with the conventional exhaust outlet pocket or chamber 11, and with cooling fluid medium circulation chambers 12.

The metal around the upper end of the exhaust chamber or pocket 11 is cut away for the reception of the valve seat insert 13 which is in the form of a ring and its upper inner edge beveled, as designated by 14, to form a seat for the exhaust valve V.

After the insert 13 has been seated in the circular recess formed around the upper end of the exhaust pocket or chamber, holes 15 are drilled through the outer portion of the insert and through the adjacent wall of the block and which holes extend toward the nearest cooling fluid circulation chambers. These holes may be disposed substantially parallel with the axis of the pocket or chamber 11, or as illustrated in Figs. 2 and 3, said holes may be inclined.

Driven into the holes are pins 16, the length of which is such that substantial portions of said pins project into the cooling fluid circulation chambers 12, and thus substantial portions of said pins are always subjected to the cooling action of the circulating cooling fluid.

The holes 15 may be of uniform diameter throughout their lengths, or tapered for the reception of either straight or tapered pins, and where tapered pins are driven into holes having uniform diameter throughout their lengths, an increased anchorage is provided for the pins and the insert. In some instances the holes may be threaded for the reception of threaded pins or screws or 16a, as illustrated on the lefthand side of Fig. 2, or as illustrated in Fig. 3. That portion 17 of the pin that passes through the insert and the adjacent wall of the cylinder block may be smooth and either straight or tapered, and that portion 18 of the pin that projects into the cooling fluid circulation chamber may be threaded so as to materially increase area of metal exposed to the cooling medium and consequently increasing the cooling effect transmitted to the insert.

After the pins or screws have been inserted in the holes, their upper ends are smoothed off so as to lie flush with the upper surface of the block 10 and insert 13. Thus the pins or screws function to very securely and permanently anchor the valve seat inserts in the block, and as substantial portions of said pins project into the cooling fluid circulation chambers, an exchange of temperature is effected so as to materially lower or counteract the comparatively high temperatures that are developed in the insert while the engine is in operation.

As a result of my improved construction, expansion and contraction of the insert is minimized, and which result overcomes any tendency of the insert to become loose.

In the modified construction illustrated in Figs. 4 and 5, the exhaust valve insert is composed of a plurality of segments 19, which, when properly assembled, form a ring that surrounds the upper end of the exhaust valve chamber or pocket, and formed integral with or secured to the under rear side of each insert is a pin 20 that is driven through a hole 21 formed in the cylinder block and which pin is of such length that a substantial portion thereof projects into the cooling fluid circulation chamber. If desired, that portion of the pin that projects into the cooling fluid chamber may be threaded so as to materially increase the area of metal exposed to the cooling medium.

It sometimes happens that checks or short cracks develop in the block adjacent the exhaust valve seat or the valve seat insert, and to repair such checks or cracks, the same are filled with material such as iron-cement or fine metal dust that is forced into the checks or cracks under high pressure, and to produce a cooling effect upon the material within the check or crack a hole 22 is bored in the block immediately adjacent the side of the check or crack, and driven or seated in said hole, is a pin or screw such as 23 having a substantial portion that projects into the adjacent cooling fluid circulation chamber.

In Figs. 6 and 7 I have illustrated the repair of a check or small crack that developed in the cylinder-block adjacent the exhaust valve seat, and in Figs. 8 and 9 I have shown the means employed for repairing checks or small cracks that occur in the cylinder-block adjacent a valve seat insert. To repair this condition, the check or crack is filled with iron-cement or the like, under high pressure, and a hole is, afterwards drilled through the outer portion of the insert and through the wall of the block immediately below and to the rear of said insert alongside the check or crack, and this hole receives a pin or screw such as 24 having a substantial portion that projects into the cooling fluid circulation chamber.

In Fig. 10 I have illustrated a series of pins 25 that are seated in holes bored in the cylinder-block immediately adjacent the exhaust valve seat 26, the lower portions of which pins project into the cooling fluid circulation chambers, and thus through exchange of temperatures, the metal in the block immediately adjacent the valve seat is cooled to a substantial extent thus materially reducing the tendency of the block to crack along the beveled edge that provides the valve seat.

Thus it will be seen that I have provided means for permanently anchoring inserted valve seats in engine cylinder-blocks, and which provision prevents the insert from becoming loose and creeping, and which actions render the inserts inefficient in service, and further, the employment of pins or screws having substantial portions that project into the cooling fluid circulation chambers is effective in exerting a cooling effect upon the insert and preventing the same from becoming loose as a result of abnormal expansion and contraction.

It will be understood that minor changes in the size, form and construction of the various parts of my improved exhaust valve seat insert retaining and cooling means may be made and substituted for those herein shown and described without departing from the spirit of my invention, the scope of which is set forth in the appended claims.

I claim as my invention:

1. The combination with an engine cylinder block having an exhaust outlet chamber, a valve seat surrounding the upper portion of said chamber and there being cooling liquid circulation chambers in the block surrounding said exhaust chamber, of pins seated in the block outwardly from said valve seat, portions of which pins extend substantial distances into the cooling liquid circulation chambers so as to effect conduction of temperatures between that portion of the cylinder block immediately adjacent the valve seat and the cooling liquid in said circulation chambers.

2. The combination with an engine cylinder block having an exhaust outlet chamber, and cooling liquid circulation chambers, of an insert seated in the block around the upper portion of said exhaust chamber, said insert being provided with a valve seat and pins extending through the joint between the outer portion of said insert and block through the adjacent walls of the block and projecting a substantial distance into the cooling liquid circulation chambers so as to effect conduction of temperatures between the insert and the liquid in said circulation chambers.

3. The combination with an engine cylinder block having an exhaust valve chamber and cooling fluid circulation chambers surrounding said exhaust chamber, of a valve seat ring inserted in the block around the upper portion of the exhaust chamber, said ring being provided on its upper inner edge with a valve seat, said ring comprising a plurality of segments and pins projecting from said segments through the wall of the block surrounding the exhaust chamber and into the cooling fluid circulation chambers.

4. The combination with an engine cylinder block having an exhaust chamber and cooling liquid circulation chambers, of a ring inserted in the block around the upper portion of the exhaust chamber, said inserted ring having a valve seat and means seated in the cylinder block outwardly from said valve seat for securing the inserted ring in said cylinder block, which securing means extends a substantial distance into the cooling liquid circulation chambers surrounding the exhaust chamber so as to effect a substantial degree of conduction of temperatures between said inserted member and the liquid in said circulation chambers.

CHARLES AUGUSTUS JENSEN.